US008118365B2

(12) United States Patent
Henshaw (10) Patent No.: US 8,118,365 B2
(45) Date of Patent: Feb. 21, 2012

(54) VEHICLE SEATING

(76) Inventor: Robert J. Henshaw, Newnan, GA (US)

(*) Notice: Subject to any disclaimer, the term of this patent is extended or adjusted under 35 U.S.C. 154(b) by 174 days.

(21) Appl. No.: 12/409,442

(22) Filed: Mar. 23, 2009

(65) Prior Publication Data

US 2009/0243358 A1  Oct. 1, 2009

Related U.S. Application Data

(60) Provisional application No. 61/039,393, filed on Mar. 25, 2008.

(51) Int. Cl.
*A47C 15/00* (2006.01)
*B60N 2/00* (2006.01)

(52) U.S. Cl. .................... 297/245; 297/354.13

(58) Field of Classification Search .............. 297/62, 297/257, 67, 245, 232, 244, 1, 118, 354.13, 297/423.26; 244/118.6; 105/315, 340; 5/9.1, 5/118; 114/192
See application file for complete search history.

(56) References Cited

U.S. PATENT DOCUMENTS

| | | | |
|---|---|---|---|
| 1,991,536 A | 2/1935 | Austin | |
| 2,563,917 A * | 8/1951 | Caesar et al. | 296/178 |
| 2,608,366 A * | 8/1952 | Jergenson | 244/118.6 |
| 2,953,103 A * | 9/1960 | Bohannon et al. | 105/315 |
| 2,966,199 A * | 12/1960 | Waerner | 297/62 |
| 4,440,439 A | 4/1984 | Szabo | |
| 5,425,516 A | 6/1995 | Daines | |
| 5,716,026 A | 2/1998 | Pascasio | |
| 5,722,726 A * | 3/1998 | Matsumiya | 297/322 |
| 6,237,872 B1 * | 5/2001 | Bar-Levav | 244/118.6 |
| 6,352,309 B1 | 3/2002 | Beroth | |
| 6,494,536 B2 * | 12/2002 | Plant | 297/284.11 |
| 6,769,739 B2 | 8/2004 | Salzer | |
| 7,025,306 B2 | 4/2006 | Saint-Jalmes | |
| 7,108,226 B2 | 9/2006 | Quan | |
| 7,213,882 B2 | 5/2007 | Dryburgh | |
| 2006/0000947 A1 | 1/2006 | Jacob | |
| 2006/0086864 A1 | 4/2006 | Beroth | |
| 2007/0164157 A1 | 7/2007 | Park | |
| 2007/0241232 A1 | 10/2007 | Thompson | |

OTHER PUBLICATIONS

International Search Report for PCT Application No. PCT/2009/001823 filed Mar. 23, 2009 and mailed May 22, 2009.

* cited by examiner

*Primary Examiner* — Milton Nelson, Jr.
(74) *Attorney, Agent, or Firm* — Lewinski Law Group LLC (57) ABSTRACT

In an example embodiment, a vehicle seating arrangement includes a fore-facing lower seat convertible between a sitting position and a lie flat sleeping position in a lower horizontal plane, an aft-facing lower seat convertible between a sitting position and a lie flat sleeping position in the lower horizontal plane, and a fore-facing upper seat positioned between the fore-facing lower seat and aft-facing lower seat, the fore-facing upper seat convertible between a sitting position and a lie flat sleeping position in an upper horizontal plane. The seats may be arranged so that portions of the fore-facing lower seat and aft-facing lower seat underlap the fore-facing upper seat when the seats are positioned in the lie-flat sleeping position.

21 Claims, 9 Drawing Sheets

VEHICLE SEATING

CROSS-REFERENCE TO RELATED APPLICATIONS

This application claims priority benefit to U.S. Provisional Application No. 61/039,393 filed on Mar. 25, 2008, entitled "Vehicle Seating", which is entirely incorporated herein by reference.

FIELD OF THE INVENTION

The present invention relates to seating and seating arrangements for passenger vehicles, and more particularly, to aircraft seating arrangements in which seats can be converted between a sitting position and a lie-flat sleeping position.

BACKGROUND

Providing an optimum seating arrangement for an aircraft is difficult and complex, requiring that passenger comfort be weighed against the generally opposing goal of maximizing aircraft seating capacity. Generally, the more spacious and comfortable a seat, the higher the fare an airline can charge for the seat, but the fewer number of seats that can be provided in the limited confines of the aircraft.

A traditional aircraft seat includes a base portion upon which a passenger sits and a seatback against which a passenger leans back. The seatback is typically adjustable to move between a generally upright "takeoff and landing position" and a slightly reclined "traveling" position. Aircraft seats are typically arranged side-by-side in rows transverse to the longitudinal direction of the aircraft with the seats facing forward in the direction of travel. The seat rows are typically spaced apart from one another so that the seats have a pitch between 27 and 78 inches in commercial aircraft to provide legroom between the rows. Longitudinal aisles may be provided that divide the seats into sections. For example, the seating arrangement may include two aisles that divide the seating arrangement into a center section and two side sections to provide improved ingress and egress to the rows and access to emergency exits.

To maximize profit, airlines often attempt to entice passengers to pay a higher fare for upgraded or premium seating. For example, a premium seat may be wider and recline further than a standard fare seat and may be part of a seating arrangement that provides additional legroom. Some aircraft are divided into different classes, with each class having a different level of seating space and comfort. For example, an aircraft may have a higher fare "first class" section near the front of the plane and a lower fare "coach" section at the rear of the plane.

In recent years, seats have been developed that are convertible between a "takeoff and landing" position to a "lie-flat" sleeping position to allow the seats to be used as "beds." These seats have proven popular on long haul and international flights where a passenger may desire to sleep aboard the aircraft. While such lie-flat seating provides additional comforts to passengers, thereby allowing airlines to charge higher fares, they require additional space, which makes it difficult to provide such seats in large quantity. For example, a typically angled lie-flat seating arrangement has a seat pitch of about 58 to 63 inches, which is significantly more than seating typical of coach class which range from 27 to 34 inches. Angled lie-flat seating places one passenger's head over the feet of the passenger directly behind him or her. Non-angled lie-flat seating will typically have a pitch of 76 to 82 inches and will often rely on an alternative arrangement of seats to facilitate efficient utilization of space in the aircraft.

Several attempts have been made to provide fully reclinable, lie-flat, or sleeper seat seating arrangements that efficiently utilize the limited aircraft cabin space. Some arrangements have attempted to angle the seats in a horizontal plane in a "chevron" style in an attempt to increase seating density while providing lie-flat seating.

Others have attempted to overlap portions of the seats vertically so that a passenger's feet are placed underneath the head of another passenger of a seat in front. For example, seats may be provided that recline at an angle so that the feet of a passenger in a rearward seat extend below the head of another passenger reclined in a seat in the row in front. Others have provided back-to-back seating in which seats are placed back-to-back, lengthwise and alternate seats are placed substantially above the passageway floor and the remaining seats below the passageway floor, so that the back of the upper seat recline over the back of the adjacent lower seat.

While fit for their intended purposes, the prior art arrangements are difficult to implement in a standard aircraft. Furthermore, they do not provide the level of comfort that a generally horizontal lie flat seat provides. In addition, in some prior art arrangements the head of a passenger is covered by the seat of another passenger, which is generally undesirable. Many of the prior art arrangements also do not provide sufficient space savings to allow for the installation of a sufficient number of seats to make the arrangement cost effective.

SUMMARY OF THE INVENTION

In an exemplary embodiment, an aircraft seating arrangement takes the form of a fore-facing lower/fore-facing upper/aft-facing lower seating arrangement that allows the lower seat passengers to extend their feet under the upper seat passenger when the seats are placed in a lie-flat position. The arrangement may include a center upper seat facing a first direction, the upper seat convertible between a sitting position and a generally flat sleeping position to form a lie-flat bed in an upper horizontal plane; a first outer lower seat positioned at a first side of the center seat, the first outer lower seat convertible between a sitting position and a generally flat sleeping position in a lower horizontal plane; and a second outer lower seat positioned on an opposite side of the center upper seat that is convertible between a sitting position and a generally flat sleeping position in the lower horizontal plane; the first and second seats may be aligned one behind the other, the lower seats facing inward to the center upper seat so that the first lower seat faces in the first direction and the second lower seat faces an opposite direction. The first and second outer lower seats may be arranged so that a portion of the first lower seat underlaps a first end of the upper seat and a portion of the second lower seat underlaps an opposite end of the upper seat when the seats are placed in a sleeping position. This arrangement allows passengers in the two lower outboard seats to place their feet beneath the head and feet of the passenger in the upper seat to provide an efficient use of space without covering the head of any of the passengers.

In one exemplary embodiment, a footrest is provided spaced apart from the base portion of a lie flat upper seat in the upper horizontal plane and defines a foot portion of a lie-flat bed when the seat is placed in a sleeping position. The footrest may be engageable with a portion of the seat. For example, an upper footrest may be provided in an upper horizontal plane opposite an upper seat so that a base portion of the upper seat moves forward to engage the upper footrest when the seat is placed in a sleeping position so that the seat and the footrest together form a generally horizontal "bed" in the upper horizontal plane. Similarly, a first lower footrest may be provided in the lower horizontal plane for engagement with the first lower seat when the lower seat is moved to the sleeping position to form a first bed in the lower plane. Likewise, a second footrest may be provided in the lower plane for engagement with the second lower seat to form a second bed in the lower horizontal plane. The lower footrests may be positioned beneath the upper bed so that the feet of passengers in the lower seats underlap the upper seat passenger.

An exemplary embodiment of a seating module includes a seat assembly and a partition-footrest assembly that is spaced opposite the seat assembly in a horizontal plane. The seat assembly may include a support shell and a seat movably attached to the shell, the seat including a seatback and a seat base for supporting a passenger. The seat shell may include various support structure for supporting the seat and securing the seat assembly to the aircraft, for providing a partition or privacy screen between passengers, as well as providing mounting surfaces for various items. In one exemplary embodiment, the seat shell includes a back wall extending behind the seat and sidewalls that extend around the seat and a base wall that supports the seat. The walls defining a receiving area for housing the seat. The seat is movably attached to the shell so that the seat can be moved between a sitting position in which the seatback is in a generally vertical position and a sleeping position in which the seatback is in a generally flat position in a horizontal plane. The seat may be engageable with a footrest provided in the horizontal plane so that the seat and the footrest together form a lie-flat bed in the horizontal plane when the seat is placed in the sleeping position. The back and sidewalls of the upper seat shell may serve as partitions or privacy shields for the upper seat passenger. The back of the seat shell may serve as a mounting or display surface for a display for viewing by a passenger in the lower seat and may include various pockets, recesses, compartments and the like to store trays, safety equipment, reading material, or other items. The shell sidewall may include various storage compartments, electrical connections, and other devices commonly used in an aircraft such as air, audio port, power port, etc.

In one embodiment, a raised seating module includes a platform having a generally horizontal surface positioned above the aircraft cabin floor that defines a raised module floor, an upper seat assembly coupled to the raised floor, and a partition-footrest assembly that is coupled to the raised floor and positioned opposite the seat assembly. The space between the seat assembly and the partition-footrest assembly providing legroom for the passenger sitting in the seat and providing an access area for entering and exiting the raised seating module. One or more steps may be provided to the module to assist a passenger in entering and exiting the raised upper seat.

The raised seat assembly may include a seat having a base provided above the raised floor at a height greater than a standard seat height and a seatback coupled to the base at a pivot joint. The seat may be adjustable between a sitting position and a generally flat sleeping position in an upper horizontal plane by reclining the seatback relative to the base so that the seat back and base are generally flat in the upper horizontal plane.

The partition assembly of the raised seating module may include an upper footrest provided in an upper horizontal plane that is adapted for engagement with the upper seat to form a bed in the upper horizontal plane. The partition assembly may also include a shell frame having an upper back wall, sidewalls, a lower front wall and a horizontal footrest support for supporting the upper footrest. The upper back wall, upper sidewalls and horizontal support defining an upper footwell for housing the upper footrest. The footrest may comprise a cushion or other support provided on the horizontal support for receiving the feet of an upper seat passenger. The horizontal support may extend beyond the footrest to provide a receiving surface for the base of the upper seat when the upper seat is placed in the sleeping position. The back wall of the partition-footrest acts as a partition between the upper passenger and a lower seat passenger and also serves as a mounting surface for displays, pockets, storage compartments and the like for the lower seat passenger. For example, a display may be mounted on the rear of the upper wall of the partition shell for viewing by a lower seat passenger facing the upper seat.

The raised seat module may also include additional components compatible for use in conjunction with lower seats to provide a three-seat seating module. For example, the upper seat assembly may include a lower footrest for use in conjunction with a first lower seat to form a bed in a lower horizontal plane. The seat shell may include a lower front wall, lower sidewalls and an open back that together define a footwell for housing the lower footrest in a lower horizontal plane to that it is accessible by the feet of a passenger occupying an aft lower seat. The lower footrest may be provided beneath the seat base of the upper seat so that the lower footrest underlaps the upper seat base when the upper seat is in the sitting position and underlaps the upper bed when the upper seat is placed in a sleeping position. This allows the upper seat and the lower seat to be spaced at a pitch that allows for an increased number of lie-flat seats compared with traditional seating arrangements.

The partition-footrest assembly may include a lower footrest in a second lower horizontal plane. The partition-footrest shell may include a downwardly extending lower front wall that together with the lower portions of the sidewalls defines a lower footwell with an open end opposite the open end of the upper footwell. A lower footrest may be provided in the lower footwell to allow access to the footrest by a lower seat passenger facing the partition-footrest assembly. The upper and lower footrest in the partition-footrest assembly may be provided beneath one another to allow for the overlapping of the upper seat passenger's feet with the lower seat passenger's feet in the lower footwell when the upper and lower footrests are in use. The lower footrest provided in the upper seat assembly and the lower footrest provided in the partition-footrest assembly may be provided in the same lower horizontal plane. This provides a generic lower seat that may be used in either a fore or aft-facing arrangement with either of the lower footrests.

The upper seat module may thus be used in conjunction with first and second lower seats and lower seat modules to form lie-flat seating arrangements. For example, the upper seat module may be used in conjunction with a pair of lower seats to form a three-seat seating arrangement that provides an upper bed in an upper horizontal plane and two lower beds in a lower horizontal plane. The upper seat of the upper seating module and the lower seats of the lower seating modules may be arranged at a distance so that the footrest of the lower seat underlaps a portion of the upper bed. Furthermore, the upper seat module and lower seat modules or assemblies may be arranged in rows, such as rows of two to form a six-seat seating module, rows of three to from a nine-seat sitting module, etc. The modules can also be combined with other seating modules to form various seating arrangements.

DESCRIPTION

As required, exemplary embodiments of the present invention are disclosed herein. These embodiments are meant to be examples of various ways of implementing the invention and it will be understood that the invention may be embodied in alternative forms. The figures are not to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention. The terms "fore" and "aft" are used merely for orientational purposes in reference to the particular exemplary embodiments shown in the drawings.

For purposes of teaching, and not limitation, the exemplary embodiments disclosed herein are discussed in the context of an Airbus A-330 or A-340 aircraft. However, the present invention is applicable to other aircraft as well, such as, by way of example and not limitation, Airbus models A-300 and A-380 models, and Boeing 747, 767, 777, and 787 models, McDonald Douglas MD-11, as well as other aircraft and vehicles.

Figure 1:
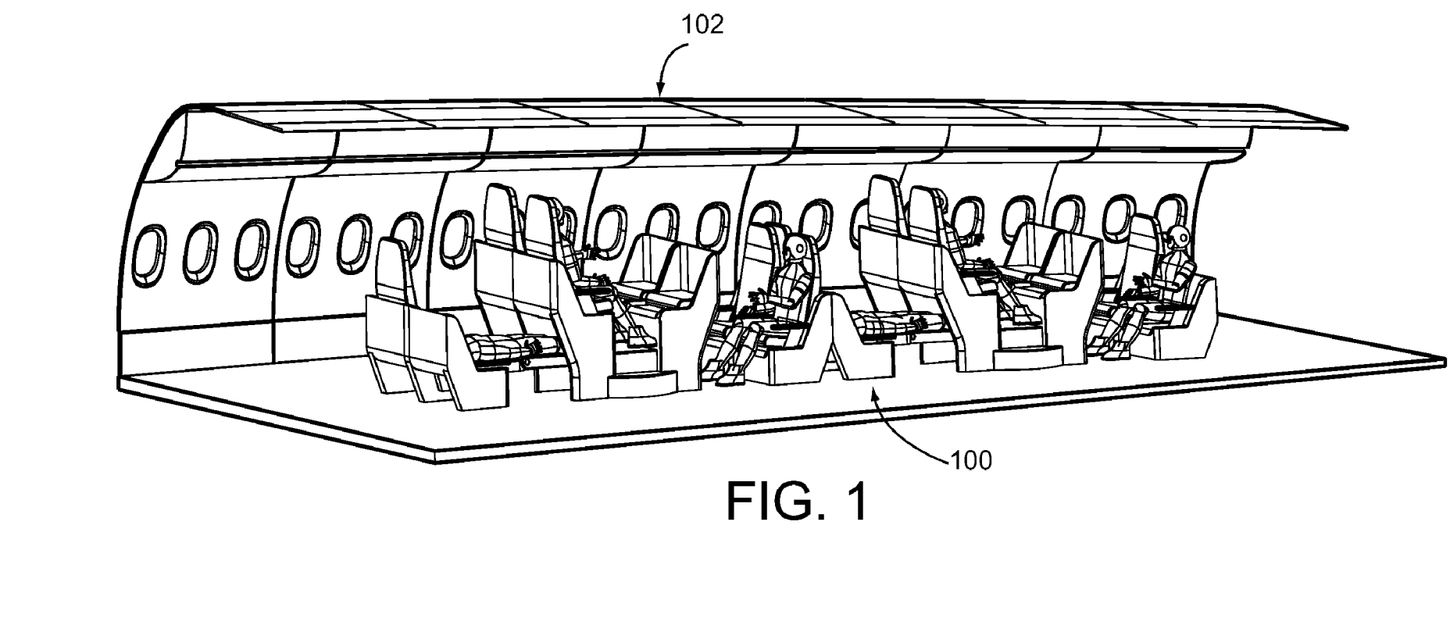
FIG. 1 shows a perspective view of an aircraft seating arrangement in accordance with an exemplary embodiment of the invention.
Figure 2A:
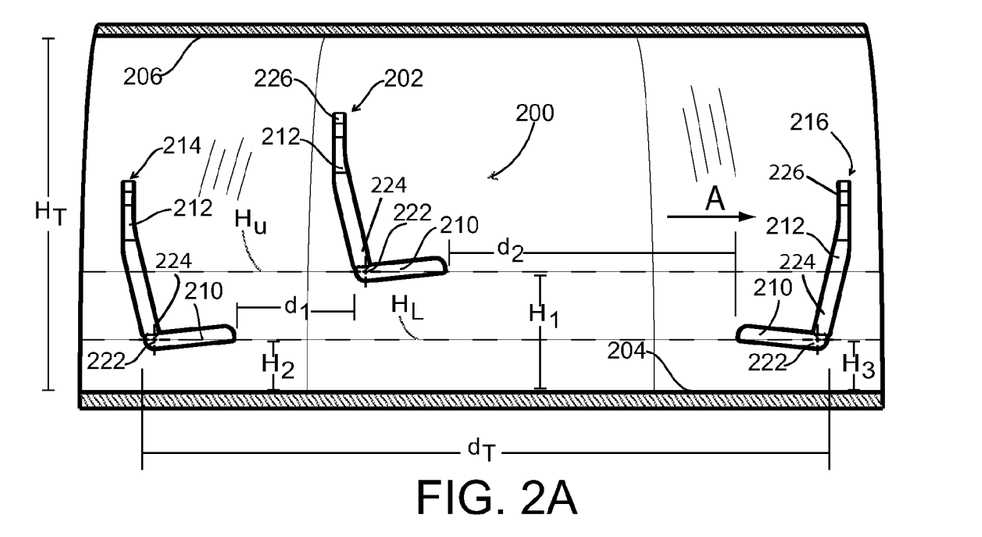
FIGS. 2A-2B show side views of an aircraft seating arrangement in accordance with an exemplary embodiment of the invention.
Figure 2B:
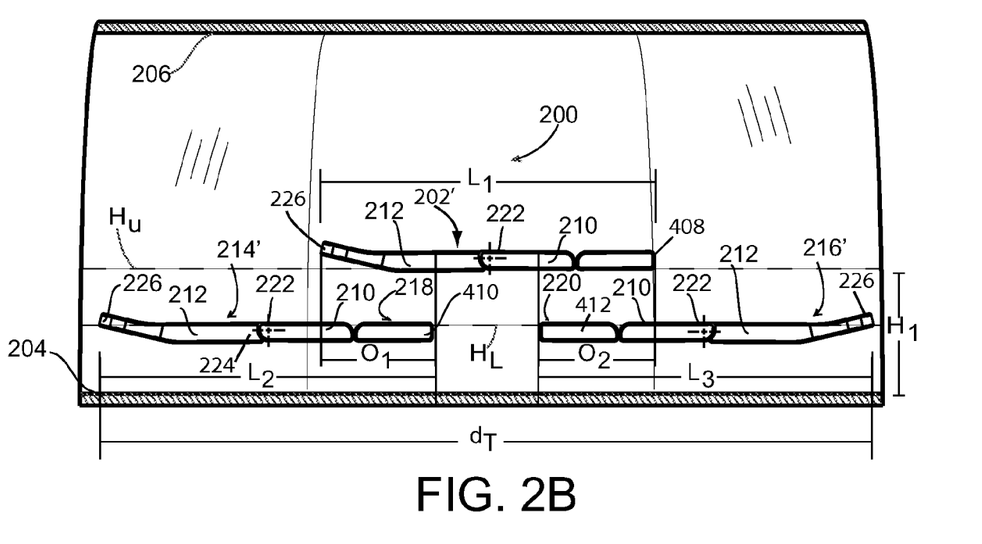
Figure 3:
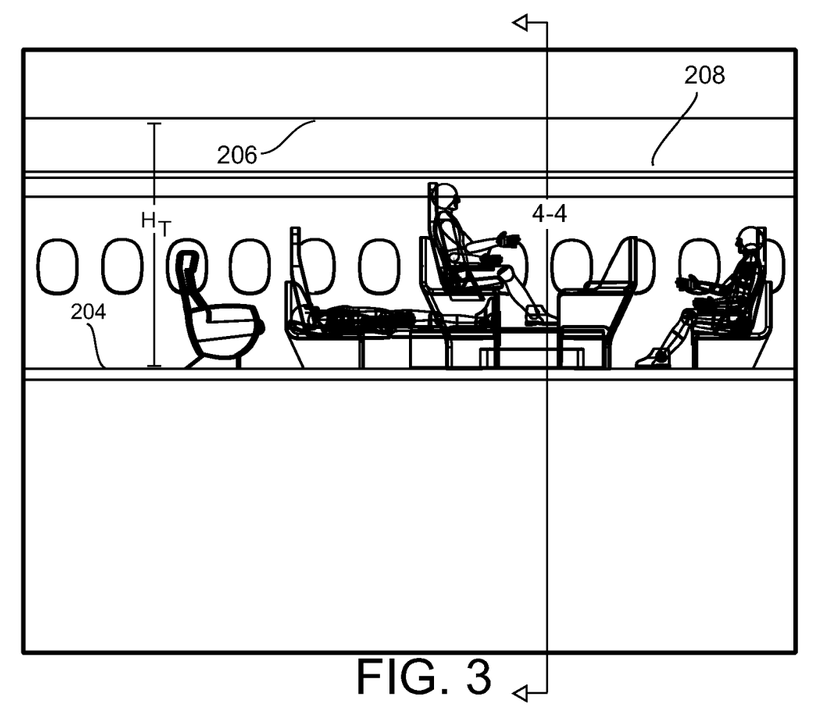
FIG. 3 shows a side view of the aircraft seating arrangement of FIG. 1 along cut line 3-3.

Turning to the Figures wherein like numerals represent like elements throughout the several views, FIG. 1 shows an exemplary embodiment of an aircraft seating arrangement 100 in an aircraft 102. FIGS. 2A-2B show a side view of an exemplary embodiment of a lie-flat seating arrangement 200 that includes a center upper seat 202 provided at a height H1 above an aircraft cabin floor 204 in a cabin having a ceiling 206 and a floor-to-ceiling height of HT. Due to the generally circular cross section of an aircraft fuselage, the height HT of the cabin may vary depending upon the location with respect to the longitudinal centerline of the aircraft. For example, the available headroom generally decreases as one moves away from the centerline CL as shown in FIGS. 3 and 4.

Figure 4:
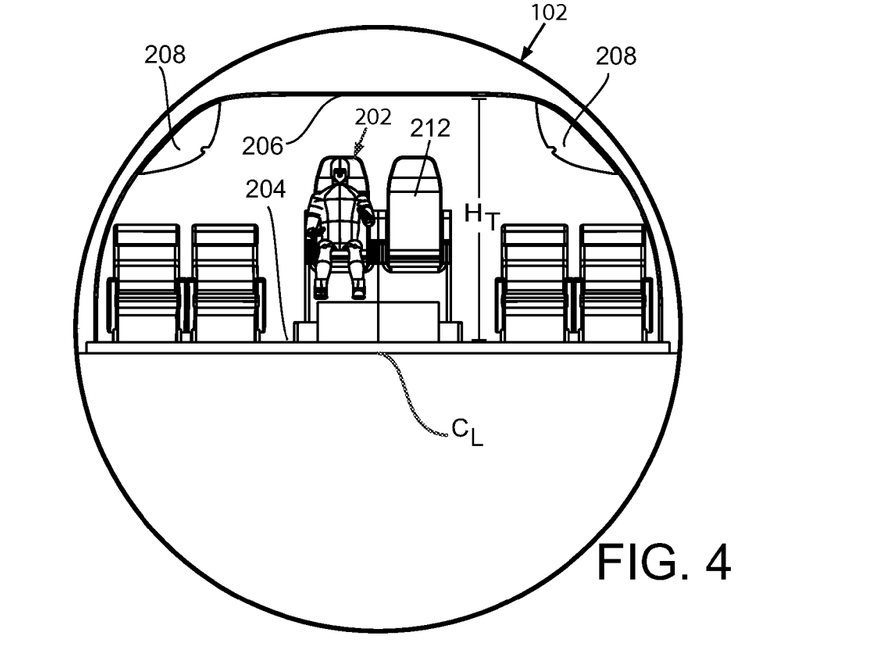
FIG. 4 shows the aircraft seating arrangement of FIG. 3 along cut line 4-4.

In the embodiment shown in FIGS. 2A-2B the upper seat 202 is placed generally along the centerline CL of the aircraft as shown in FIG. 4. The actual amount of headroom available to a passenger sitting in an upper seat will also depend upon the particular aircraft and its layout, such as whether overhead storage bins 208 are provided (FIGS. 3 and 4). As discussed in more detail below, the seating arrangements discussed herein may provide additional storage at the seats, thereby decreasing the need for overhead storage and allowing for the removal of overhead bins along the centerline of the aircraft.

The upper seat 202 faces forward to the front of the aircraft in a first longitudinal direction shown by arrow A pointing in the direction of flight of the aircraft 102. The upper seat 202 includes a seat base 210 for supporting the legs and buttocks of a passenger and a seatback 212 coupled to the base 210 to support the passenger's back. The upper seat 202 is convertible between a sitting position in which the seatback 212 is generally upright (FIG. 2A) and a generally horizontal sleeping position (FIG. 2B) in which the seatback 212 is generally horizontal so as to form an upper bed 202' in an upper horizontal plane HU.

An aft lower seat 214 is provided a distance d1 aft of the upper seat 202 with the seat base 210 at a height H2 above the cabin floor 204. The aft lower seat 214 faces forward in the same direction as the upper seat 202 so that a passenger of the aft lower seat 214 looks at the rear of the upper seat 202. The aft lower seat 214 is convertible between a sitting position shown in FIG. 2A to a generally flat sleeping position shown in FIG. 2B to form an aft lower bed 214' in a lower horizontal plane HL. A forward lower seat 216 is provided a distance d2 forward of the upper seat 202 at a height H3 and is convertible between a sitting position (FIG. 2A) and a generally flat sleeping position to form a forward lower bed 216' in the lower horizontal plane HL (FIG. 2B).

The aft 214 and fore 216 lower seats are spaced from the upper center seat 202 so that the seats take up a longitudinal space of the cabin floor 204 having a distance dT, i.e., the distance from the outer edge of the aft lower seat 214 and the fore lower seat 216 has a footprint of a length dT. The spacing of the lower seats 214, 216 from the upper seat (d1 and d2) referred to as the seat pitch is such as to provide sufficient leg room for the passengers of the upper 202 and lower seats 214, 216 when in a sitting position while allowing underlapping in the sleeping position. For example, the distance d1 may be 60".

In the exemplary embodiment of FIGS. 2A-2B the base 210 of the upper seat 202 moves forward and the base 210 of the lower seats 214, 216 are moveable inward toward the upper seat 202 when the seats 202, 214, 216 are placed in a sleeping position to form lower beds 202', 214', 216' so that a portion 218, 220 of the lower beds 214', 216' underlap a portion of the upper bed 202' by an amount O1 and O2. For example, the seatback 212 of the seats 202, 214, 216 may recline as the seat base 210 moves horizontally. The seatback 212 angles downward about a pivot point 222 with the seat base 210 so a bottom end 224 of the seat back moves laterally as the top end 226 moves downwardly. Because both lower seats 214, 216 face inward to underlap the raised center seat 202, the feet of the passengers in the lower seats 214, 216 will underlap portions of the upper bed 202' when the seats are placed in a sleeping position. As described in more detail below with reference to FIGS. 5A-5B, a footrest 408, 410, 412 may be provided that may be coupled to the seat base 210 of an associated seat 210, 212, 214 or provided as a stand-alone device that engages the seat base 210 when a seat is placed in a sleeping position to provide a foot portion of the lie-flat bed.

The underlapping of the lower seats 214, 216 with the upper seat 202 allows for efficient use of cabin spacing. Furthermore, it provides a generally horizontal sleeping surface of substantial length without covering the passenger's head. This allows the arrangement to provide lie-flat seating within the same longitudinal space as that used in the sitting position. In addition, because the lower seats 214, 216 move inward toward the center seat, two lower seats may be positioned back-to-back in different modular assemblies. As discussed in more detail below, the length of the total distance from the outer edges of the beds 214', 216' may remain dT whether the seats are in the sitting or sleeping position.

The particular size and spacing of the upper 202 and lower 214, 216 seats may be adjusted to form a desired seating arrangement. For example, the height H1 of the upper seat 202 may be changed to accommodate the ceiling height of a particular aircraft. In the exemplary embodiment shown in FIGS. 2A-2B, the aircraft is an Airbus A-330 or A-340 with a floor-to-ceiling height of approximately 92" along the aircraft centerline without overhead storage bins. In that example, the upper seat may be raised 16" above the height of the lower seat height so that a seating arrangement has the following measurements: HT=approximately 92", H1=30.5" at cushion center line, H2=14" at cushion center line, H3=14" at cushion center line, d1=20.5", d2=70". Thus, in that arrangement, the lower beds 210', 212' are provided in the same lower horizontal plane HL. The seatbacks 202, seat bases 206, and footrests 048, 410, 412 may have lengths of 36", 20", and 22", respectively, so that they combine to provide a bed 202' of a length L1 in the sleeping position of 78". This allows a passenger of reasonable height to fully extend in the beds 202', 214', 216'. In addition, the afore-mentioned arrangement will provide an upper seat passenger 76" of headroom (FIG. 6A standing from H4) in an A-330/A-340 aircraft with an approximate ceiling height of 92".

In the exemplary embodiment shown in FIGS. 2A-2B and 5A-5B, the seat base 210 of the lower seats 214, 216 moves inward toward the upper center seat a distance of 30" and the upper seat 202 moves a distance of 30" forward when put into a sleeping position so that the underlap O1 and O2 is 25.8". This arrangement thus allows a each passenger a total sleeping surface length of 78" (L1; L2; L3) while only taking up a longitudinal distance of the aircraft of dT, which in this example is 180". Thus, passenger sleeping surfaces totaling 234" (L1+L2+L3) in length are provided in an arrangement which takes up a longitudinal length of the aircraft of only 180" which is approximately the same pitch as an angled lie-flat seat.

This provides a seating arrangement that provides lie flat seating surface totaling 3 L (234 inches) while only taking up a longitudinal footprint having an overall length LT which is equal to the total length dT used by the seats 202, 214, 216 in the sitting position. Thus, three reasonably tall passengers can be provided with lie flat seating in an area having a length of only 180". Furthermore, unlike some of the prior art seating, the beds 202', 214', 216' can be placed in a generally horizontal plane which is a more comfortable sleeping position than some of the angled lie flat beds of the prior art.

Figure 5A:
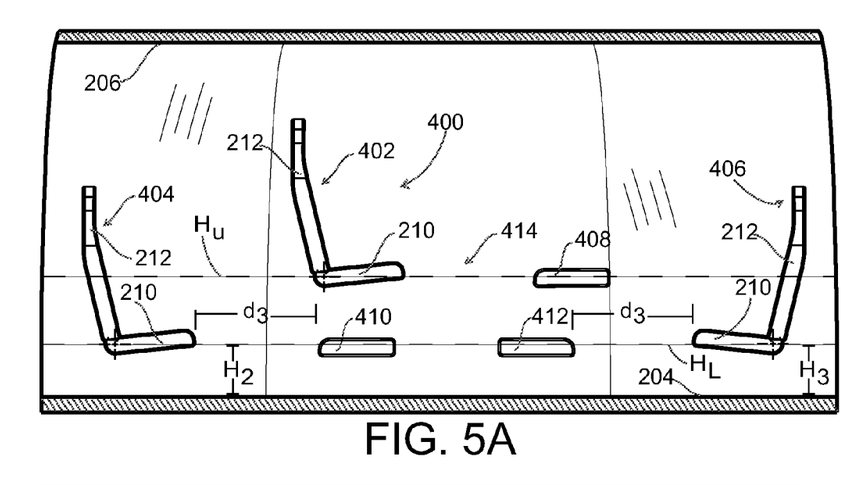
FIGS. 5A-5B show a side view of seating arrangement in accordance with an exemplary embodiment of the invention in which footrests are used.
Figure 5B:
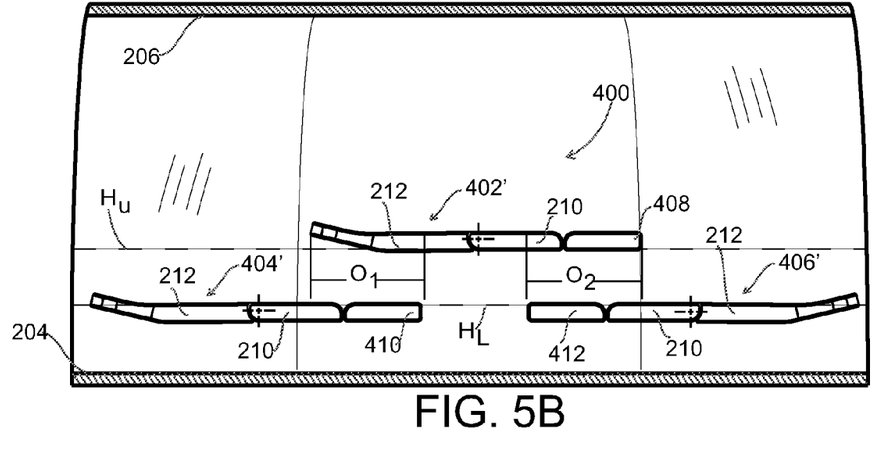

FIGS. 5A-5B show an exemplary embodiment 400 of a seating arrangement having an upper center seat 402, an aft lower seat 404, a forward lower seat 406 and upper foot rest 408, aft lower footrest 410 and fore lower footrest 412 which together form lie-flat beds 402', 404', 406' (FIG. 5B). As shown in FIG. 5A, the upper footrest 408 may be provided in a spaced-apart relationship with an upper seat 402 to provide a space 414 between the upper seat 402 and the footrest 408 for a passenger's legs when the passenger is in a sitting position. The upper footrest 408 may be provided in an upper horizontal plan HU. As shown in FIG. 5B the upper seat 402 may be convertible to a generally horizontal sleeping position in the upper horizontal plane HU to form a generally flat surface. The seat base 210 may engage the upper footrest 408 so that the seatback 212, seat base 210, and upper footrest 408 together form a lie-flat bed 402' in the upper horizontal plane.

An aft lower footrest 410 may be provided in a lower horizontal plane HL to engage the aft lower seat 404 when it is put into a sleeping position to form a lower aft bed 404' in the lower horizontal plane HL comprising the lower seat back 212, seat base 210, and footrest 410. The aft lower footrest 410 may be positioned beneath the upper seat 402 a distance d3 from the aft lower seat 404 so that the lower aft footrest 410 underlaps the base 210 of the upper seat 402 when the upper seat 402 is in the sitting position and underlaps a portion of the seatback 212 when the upper seat 402 is placed in a sleeping position to form a bed 402'. This arrangement allows the feet of a passenger in the lower aft bed 404' to underlap a portion O1 of the upper bed 402' and the head of the passenger in the upper bed 402'.

Likewise, a fore lower footrest 412 may also be provided in the lower horizontal plane HL and spaced a distance d3 aft of the aft-facing lower seat 406 and a distance d4 from aft lower footrest 410. In an example embodiment, the distance d3 is 20.5 inches and the distance d4 is 24 inches. The fore lower footrest 412 and fore lower seat 406 combine to form a lie-flat bed 406' when the seat 406 is moved to the sleeping position. The fore lower footrest 412 may be positioned below the upper footrest 408 so that the upper 408 and lower fore footrest 412 overlap so that the feet of fore lower bed 406' passenger underlap the feet of the upper bed 402' passenger.

Figure 6A:
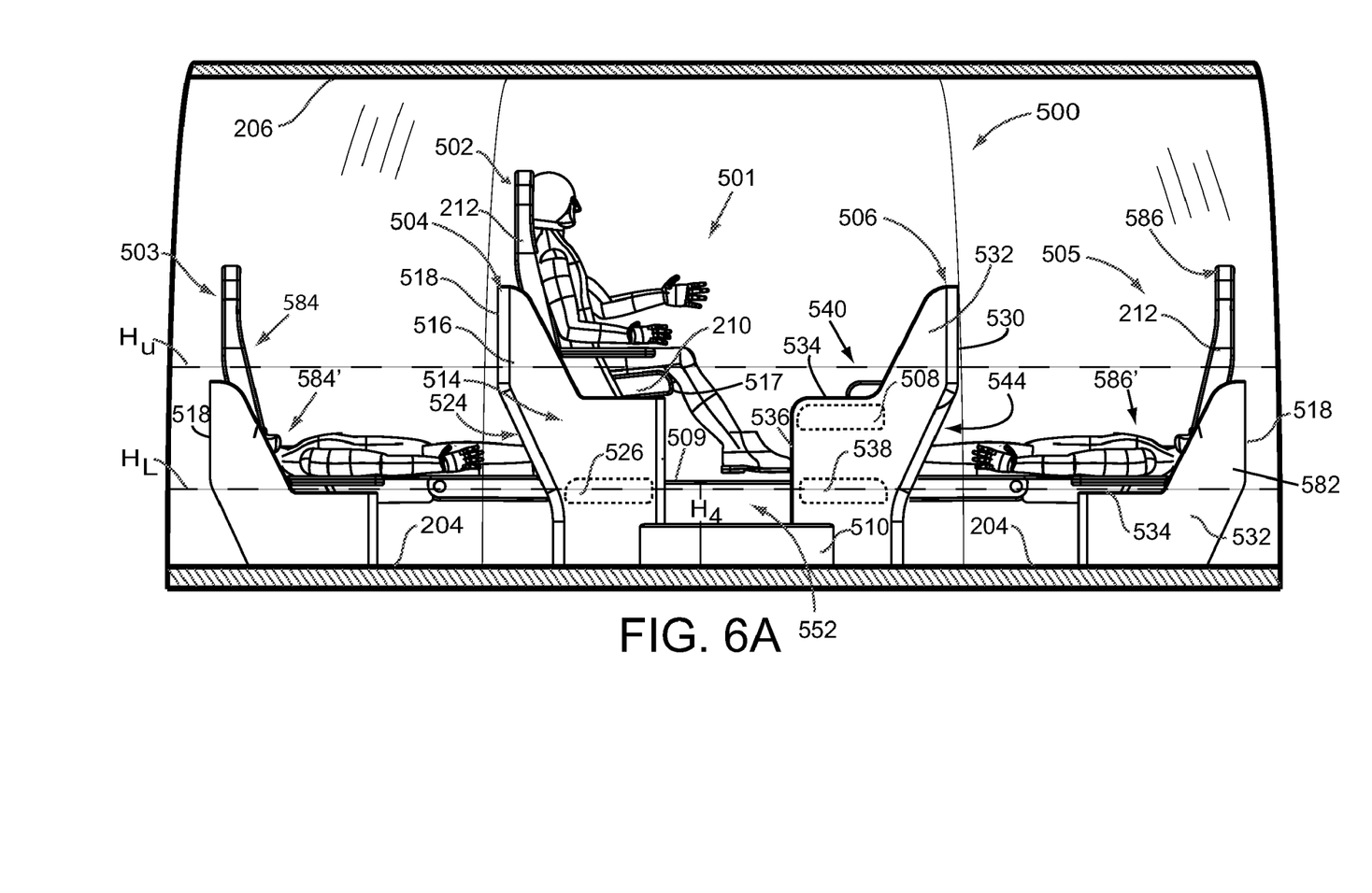
FIGS. 6A-6B show a side view of an aircraft seating arrangement employing seating modules in accordance with an exemplary embodiment of the invention.
Figure 6B:
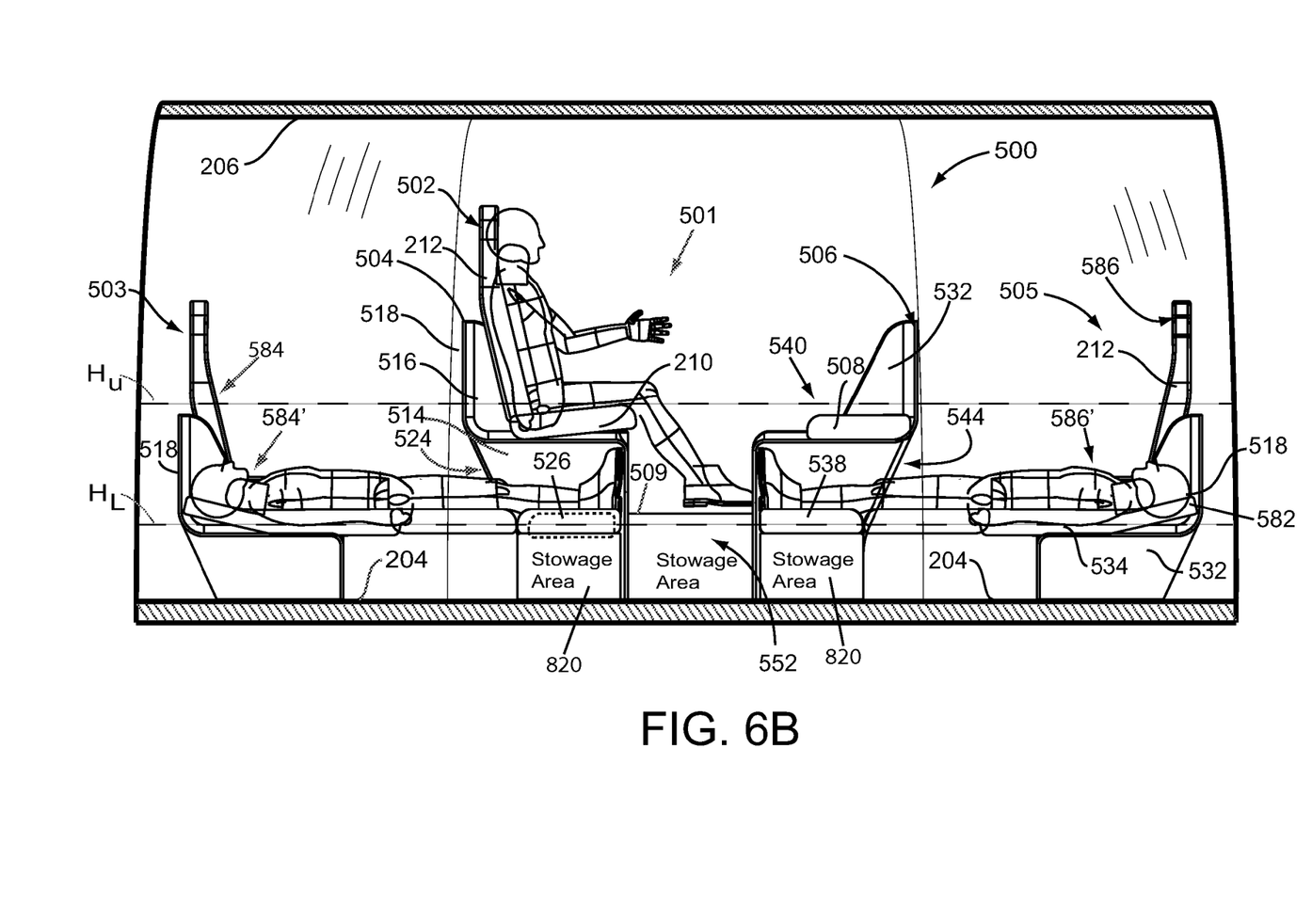

FIGS. 6A-6B show an exemplary embodiment of a seating arrangement 500 that includes a raised center seat module 501, an aft seat module 503, and a fore seat module 505. The seating modules 501, 503, 505 each define a personal travel space for a passenger. The center seating module 501 includes a platform 552, a seat assembly 504 and a partition-footrest assembly 506. The platform may be made of plastic, aluminum, or other suitable materials and attached to the main cabin floor 204 and include a generally flat surface provided between the seat assembly 504 and the partition-footrest assembly 506 at a height H4, 16 inches in this embodiment, above the cabin floor that defines a raised floor 509 of the raised seating module 501 and essentially raises the seat assembly 504 and the partition-footrest assembly 506 16" higher than that of the lower seats. In an A-330 aircraft having a ceiling height of 92" this provides a 6'4" passenger a two inch head clearance when standing on the 16" high platform 552. The seat assembly may be attached to the aircraft the standard seat rack attachment points or through the use of a palletized seat rack mounting system. One or more steps 510 may be provided to assist a user in entering the seating module 500. A storage area 512 may be provided beneath the upper floor 509, thereby alleviating the need for overhead storage. For example, flip open storage bins 512 may be provided beneath the floor 509.

The seat assembly 504 may include an upper seat 502 having a seatback 212 pivotally attached to a seat base 210 at a pivot joint 222, and an outer support shell 514 partially surrounding the seat 502. The support shell 514 may include various support structure (not shown), sidewalls 516, an upper rear wall 518, a generally horizontal base support 520, and a lower front wall 522 to support the seat 202. The rear wall 518, upper sidewalls 516, and base support 520 define a housing to which the seat 202 is movably attached. The lower front wall 522 and lower sidewalls 516 define a footwell 524 (FIG. 9) that houses a footrest in a lower horizontal plane HL.

The upper seat 502 is movably coupled to the shell 514 so that the seat back 212 and seat base 210 may be moved between a sitting position shown in FIG. 6A and a generally horizontal lie-flat sleeping position (FIG. 9) to form a bed 502' in an upper horizontal plane HU. For example, the seatback 212 may pivot about the pivot joint 222 from a generally vertical position shown in FIG. 5A to a generally horizontal position shown in FIG. 9 in the upper horizontal plane. As explained in more detail below, the seat base 210 may move forward so that an end 517 engages or abuts an upper footrest 508 housed within the partition-footrest assembly 506 in the upper horizontal plane HU. The sidewalls 516 of the shell 514 serve as partitions or privacy barriers when the seat 502 is in the sleeping position. The rear wall 518 of the shell 514 may be used as a mounting surface for displays 554, trays, pockets, emergency equipment, telecommunications equipment, or other items for use by a passenger in the lower aft seat.

The partition-footrest assembly 506 of the raised seating module 500 may include an upper footrest 508 provided in an upper horizontal plane HU that is adapted for engagement with the base 210 of the upper seat 502 to form a bed 502' in the upper horizontal plane HU. The partition assembly 506 may include a support shell having an upper back wall 530, sidewalls 532, a generally planar support member 534, and a lower front wall 536. The upper back wall 530, upper sidewalls 532 and support 534 define an upper footwell 540 having an open aft end for housing an upper footrest 508 in the upper horizontal plane HU and for receiving the feet of a passenger of the upper seat 502. The lower wall 536, lower sidewalls 532, and planar base support 560 define a lower footwell 544 having an open fore end for housing a lower footrest 538 in the lower horizontal plane HL and receiving the feet of a passenger in a lower fore seat. The upper planar support 534 may extend beyond the upper footrest 508 to provide a ledge 546 for receiving an end of the seat base 210 of the upper seat 502 when the upper seat 502 is placed in the sleeping position.

The seat back 212 of the upper seat 512 may be coupled to the seat base 210 at a pivot joint 222. To convert the upper seat 502 from a sitting position (FIG. 5A) to a sleeping position (FIG. 5B), the seat base 210 slides forward within the upper horizontal plane toward the upper footrest 508 via a linear sliding mechanism. For example, tracks (not shown) may be provided on the interior of the shell sidewalls 516 that are engaged by tabs (not shown) that extend out from the seat base 210 so that the tabs slide along the track. As the seat base 210 moves toward the upper footrest 508, the seat back 212 reclines by pivoting about the pivot point 222 so that the lower end 224 of the seat back 210 moves laterally forward in the upper horizontal plane so that the seatback 202 assumes a generally flat orientation. For example, a track (not shown) may be provided on the inner surface of the shell sidewalls 516 that are engaged by tabs (not shown) that extend from the sides of the seatback 212. As the bottom end 224 of the seatback 212 moves laterally, the top end 226 of the seatback 212 moves downwardly but generally does not move laterally so that the seatback 212 is positioned in a generally flat position in the upper horizontal plane HU. The seatback 212 and seat base 210 can be locked in the horizontal sleeping position by various mechanisms. When in the sleeping position (FIG. 9), the seatback 212 and seat base 210 form a generally horizontal sleeping surface in the upper horizontal plane HU and together with the upper footrest 508 define a generally horizontal lie-flat bed 502' in the upper horizontal plane HU.

An aft lower footrest 526 may be provided in the aft lower footwell 524 in a lower horizontal plane HL for use in conjunction with a lower aft seat module 503 as discussed in more detail below. The lower aft footrest 526 may be provided beneath the seat base 210 of the upper seat 502 so that the aft lower footrest 526 underlaps the upper seat 502. The fore lower footrest 538 may be provided in the lower horizontal plane HL for use in conjunction with a lower fore seat module 505.

The center seat module 501 may be used in conjunction with lower seat modules 503, 505 as shown in FIGS. 6A-6B and FIGS. 7-9. The fore 505 and aft 503 modules are similar to the upper seat assembly 502 and include a seat 584, 586 movably attached to an outer shell 582. The seats 584, 586 may include a seatback 212 and a seat base 210, the seat base 210 providing an upper surface in the lower horizontal plane HL. The lower seats 584 are similar to upper seat assembly 502 but are provided at a lower height H2 above the cabin floor 204 in a lower horizontal plane HL. The aft seat 584 is adapted to engage the aft lower footrest 526 to form an aft lower bed 584' in the lower horizontal plane HL. The fore seat 586 is adapted to engage the lower fore footrest 538 to form a lower bed 586' in the lower horizontal plane. The lower seats 584, 586 work similar to the upper seat 502 described above by moving the seat base 210 to engage the foot rests 526, 538 so their operation will not be discussed in detail. The seats 202 may be electrically or mechanically driven between the sitting and sleeping positions. The seating arrangement 500 also provides passengers with more space per unit of floor area occupied than conventional arrangements. Conventional manual or electrically motorized slide mechanisms may be used, as are known from conventional seats of this type. As discussed above, the spacing of the lower seats 584, 586 with the upper seat 502 allow for the underlapping of the lower seats 584, 586 with the upper seat when positioned in the sleeping position using the lower fore footrest. Various storage areas and bins may be provided beneath the footrests 526, 538 and floor 509 to serve as stowage areas. For example, a slide-out storage drawer 820 may be provided beneath the footrests and a flip open storage bin below 822 the raised floor 509.

The seat modules 501, 503, 505 can be arranged in various ways to provide different seating arrangements. Each seat module may include one or more seats. For example, while discussed in FIGS. 5A-5B as a 3-seat arrangement with a single seat upper seat module 502, a single seat aft lower seat 584, and a single seat fore lower seat 586 it is contemplated that each module may be formed of multiple seats.

With a seat pitch of 60 inches the present invention allows for horizontal lie flat seating for three passengers in a footprint of only 180 inches which is comparable to the pitch of the less-desirable angled lie-flat seating.

Figure 7:
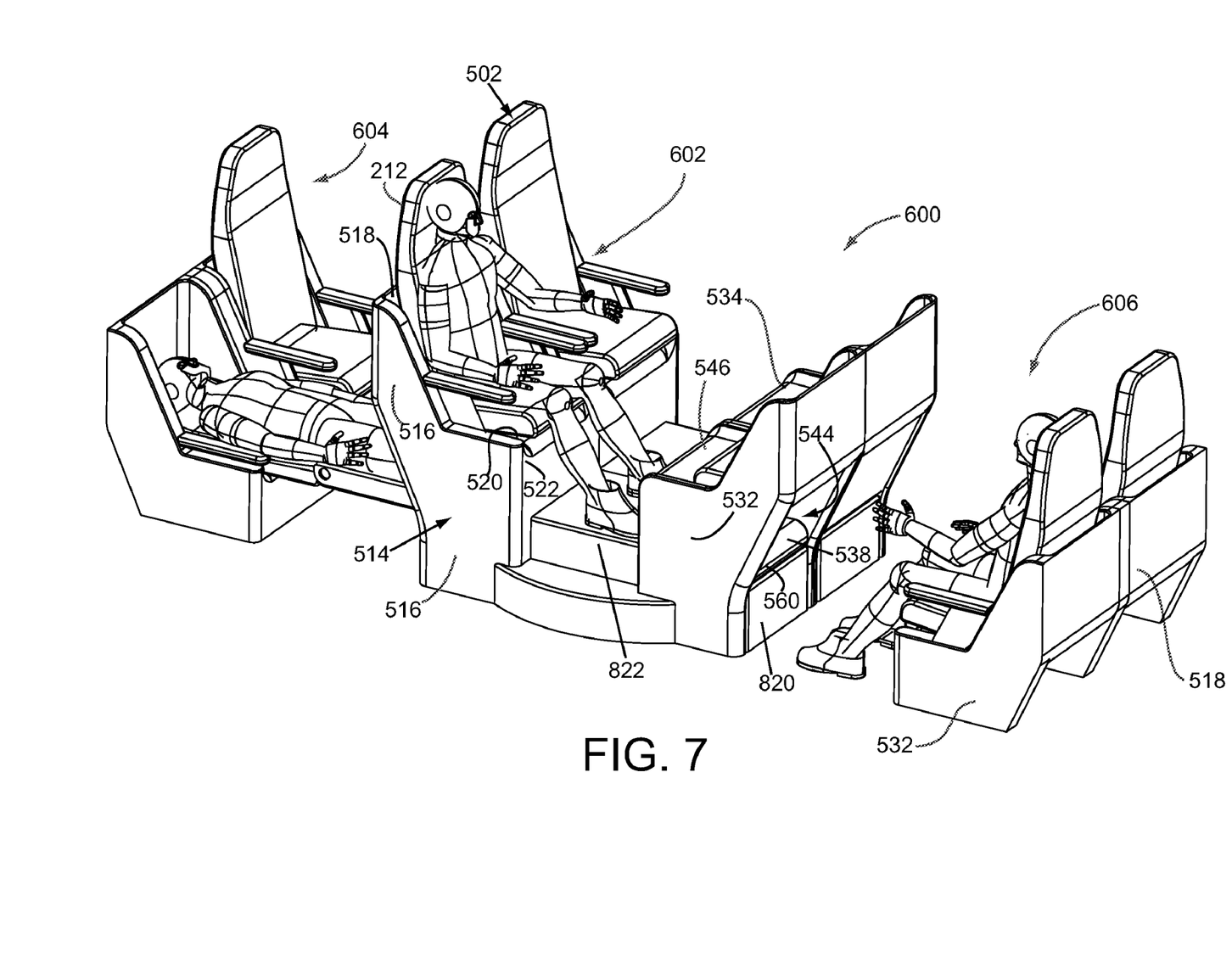
FIG. 7 shows a perspective view of an aircraft seating arrangement in accordance with an exemplary embodiment of the invention.
Figure 8:
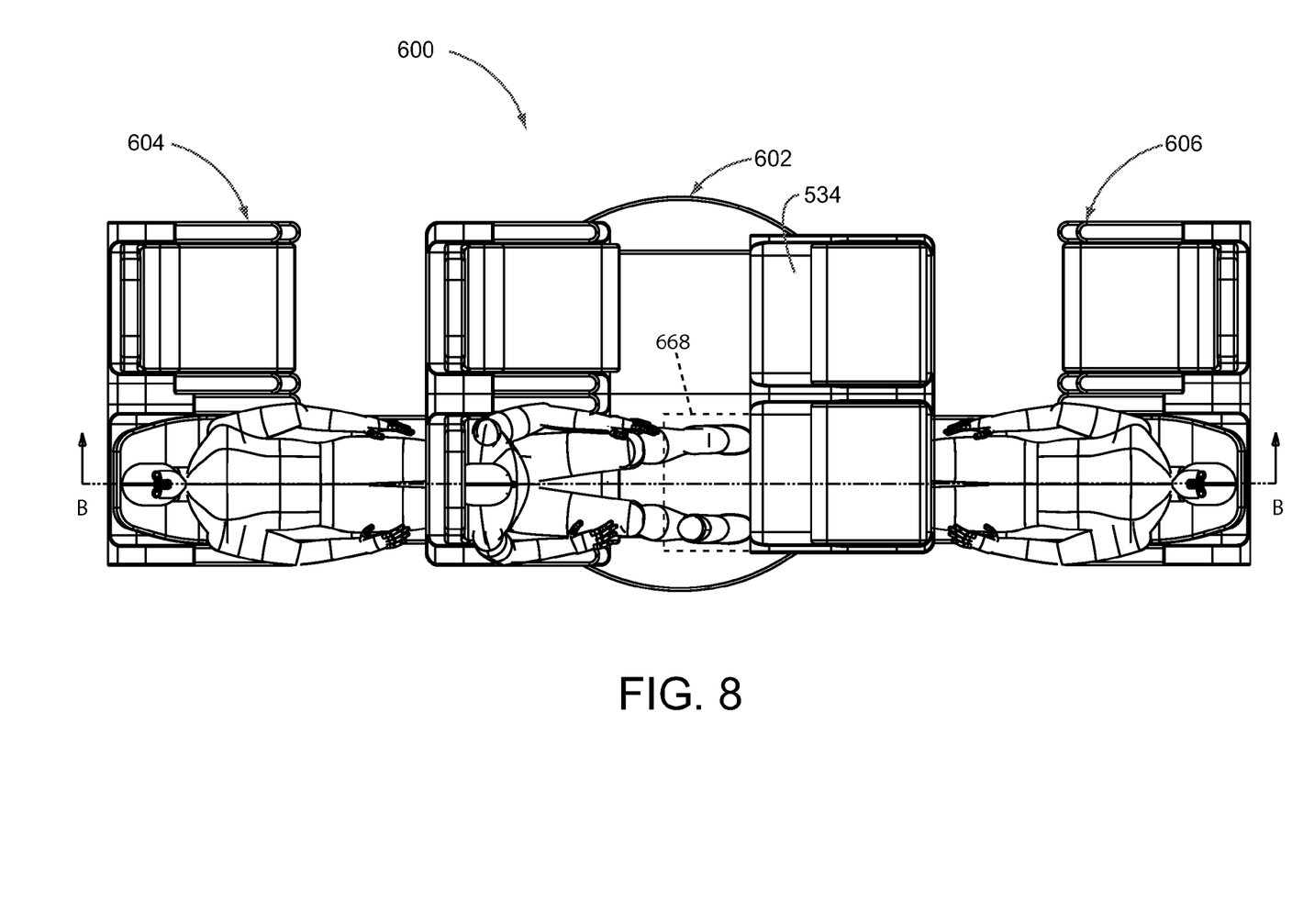
FIG. 8 shows a top view of the aircraft seating arrangement of FIG. 6.
Figure 9:
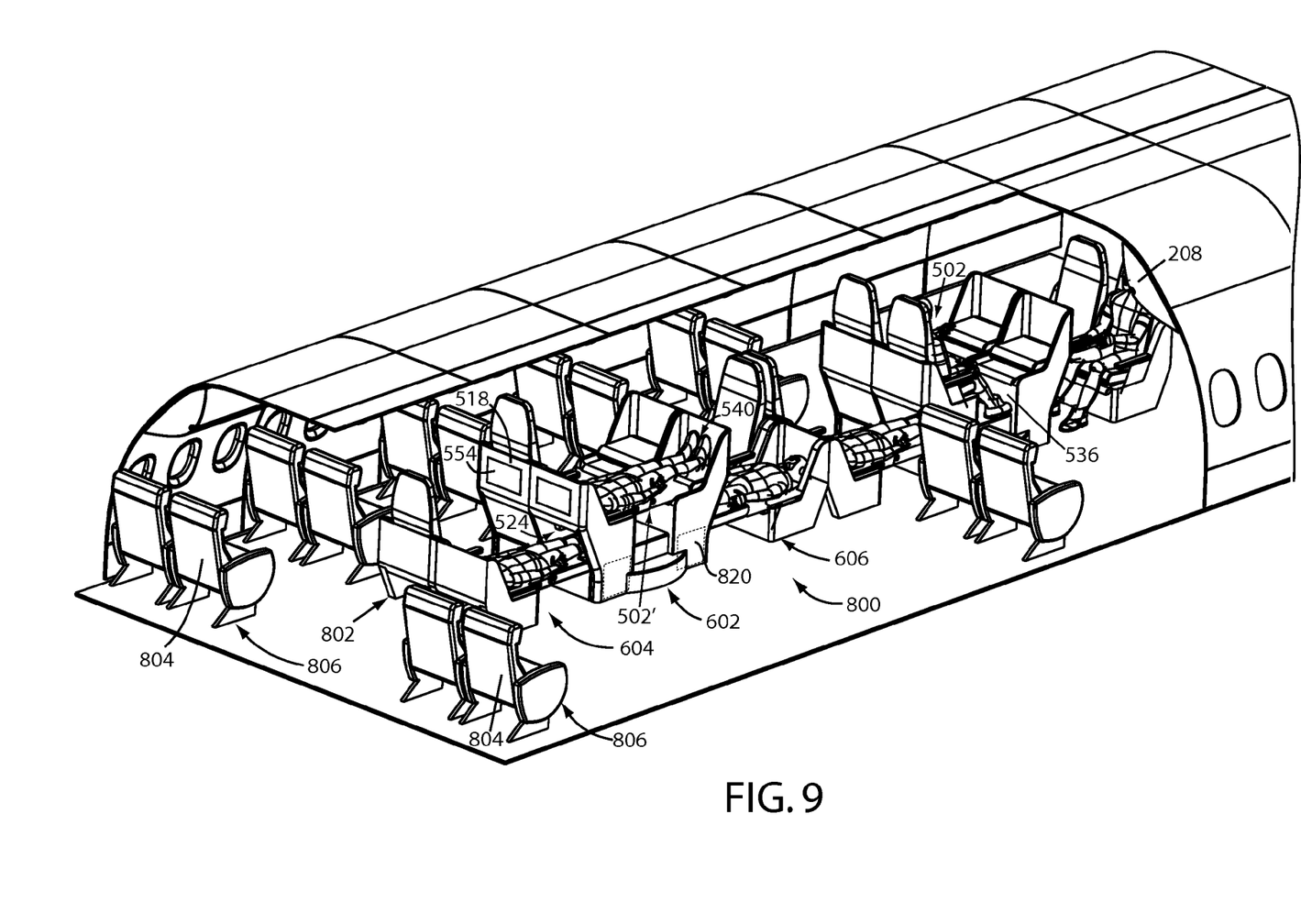
FIG. 9 shows an aircraft with a seating arrangement in accordance with an exemplary embodiment of the invention.

In the example embodiment shown in FIGS. 7 and 8, a seating arrangement 600 includes a two-seat upper seat module 602, a two-seat aft seat module 604, and a two-seat fore seat module 606. The example two-seat modules 601 allow access from either side so that it may be accessed if one of the seats is placed in the sleeping position. Multiple seating modules can also be used to form larger arrangements 800 as shown in FIG. 9 in which seating modules 602, 604, 606 are used to form a center seating section 802 and traditional seats 804 are used for side sections 806. The lower seating modules 604, 606 may be positioned back to back to form a 6-seat combined module made up of a center 602, aft 604, and fore 606 seating modules. This arrangement could be used for a center seating section of an aircraft to take advantage of the increased height along the centerline of an aircraft.

The modules may include various storage compartments that allow for the elimination of over head bins along the aircraft centerline. For example, a storage areas 820 may be provided below the lower footrests 526, 538 and below the raised floor 509. The modules also provide mounting surfaces 518, 530 for various components such as displays. Furthermore, the storage area below the footrests 526, 538 may comprise pullout-ottomans 668 to allow a passenger to prop their feet when in a sitting position.

The rear walls 518 of the shell of the seat assemblies 501, 503, 505 and the partition-footrest 506 serves as partitions between the passengers as well as mounting surfaces for displays, trays, pockets, safety equipment, etc. For example, a display such as a television may be mounted to the rear wall 518 for viewing by a passenger in a fore seat 604 which face the rear wall.

FIG. 9 shows a section of the aircraft cabin having a group of modules disposed in rows of two to form to modular arrangements that are provided in a succession of groupings. The rows of modules are disposed in alignment with each other. A grouping of a center and two lower seats may be established and successive groupings can be arranged to form a six-seat module. Multiple six-seat modules may then be used to provide a center seating arrangement of the aircraft.

The modules may be used in conjunction with conventional aircraft seating. For example, as shown in FIG. 9, six-seat seating modules may be used along the centerline of an aircraft to take advantage of the increased ceiling height and traditional seating 806 could be provided in side sections of the aircraft. This arrangement also allows for lie-flat seating to be combined with non-lie flat seating.

Again, the above-described and illustrated embodiments of the present invention are merely exemplary examples of implementations set forth for a clear understanding of the principles of the invention. Variations and modifications may be made to the above-described embodiments, and the embodiments may be combined, without departing from the scope of the following claims. For example, while described in a ⅔ fore-facing ⅓ aft facing arrangement, other combinations may be used such as ⅔ aft-facing and ⅓ fore-facing. In addition, while the seats in the exemplary embodiments were longitudinally aligned, seats may be angled with respect to one another. Furthermore, although described in the exemplary embodiments in the context of aircraft, the seating arrangement could be employed in a variety of different vehicles.

What is claimed is:

1. A vehicle seating arrangement, comprising:
    a fore-facing lower seat convertible between a sitting position and a sleeping position in a first lower plane;
    an aft-facing lower seat convertible between a sitting position and a sleeping position in a second lower plane;
    the fore-facing lower seat and the aft-facing lower seat spaced apart to define a pathway;
    an upper seat positioned between the fore-facing lower seat and the aft-facing lower seat, the upper seat convertible between a sitting position and a sleeping position in an upper plane, the upper seat accessible via the pathway; and
    wherein the fore-facing lower seat, the aft-facing lower seat, and the upper seat are arranged so that a portion of the fore-facing lower seat and aft-facing lower seat underlap the upper seat when the fore-facing lower seat, the aft-facing lower seat and the upper seat are positioned in the sleeping position.

2. A vehicle seating arrangement comprising:
    a compartment;
    a fore-facing lower seat provided in the compartment and convertible into a first lower bed;
    an aft-facing lower seat provided in the compartment and convertible into a second lower bed; and
    an upper seat provided in the compartment between the fore-facing lower seat and the aft-facing lower seat, the upper seat convertible into an upper bed and no floor separating the upper seat from the lower seats;
    wherein the fore-facing lower seat, the aft-facing lower seat, and the upper seat are arranged such that at least a portion of the first lower bed underlaps the upper bed, and at least a portion of the second lower bed underlaps the upper bed.

3. The vehicle seating arrangement of claim 2, wherein the at least a portion of the first lower bed that underlaps the upper bed comprises a foot portion of the first lower bed.

4. The vehicle seating arrangement of claim 2, wherein the at least a portion of the first lower bed that underlaps the upper bed comprises a seat base of the first lower bed.

5. The vehicle seating arrangement of claim 2, wherein a head portion of the first lower bed does not underlap the upper bed.

6. The vehicle seating arrangement of claim 2, wherein the at least a portion of the second lower bed that underlaps the upper bed comprises a foot portion of the second lower bed.

7. The vehicle seating arrangement of claim 2, wherein the at least a portion of the first lower bed that underlaps the upper bed comprises a foot portion of the first lower bed, and the at least a portion of the second lower bed that underlaps the upper bed comprises a foot portion of the second lower bed.

8. The vehicle seating arrangement of claim 2,
    wherein the upper bed comprises a seat back, a seat base, and a foot portion, the first lower bed comprises a seat back, a seat base, and a foot portion, and the second lower bed comprises a seat back, a seat base, and a foot portion; and
    wherein the foot portion of the first lower bed underlaps the seat base of the upper seat and the foot portion of the second lower bed underlaps the foot portion of the upper bed.

9. A vehicle seating arrangement, comprising:
    a fore-facing lower seat convertible into a first lower bed;
    an aft-facing lower seat convertible into a second lower bed; and
    an upper seat between the fore-facing lower seat and the aft-facing lower seat, the upper seat convertible into an upper bed;
    wherein the fore-facing lower seat, the aft-facing lower seat, and the upper seat are arranged such that at least a portion of the first lower bed underlaps the upper bed, and at least a portion of the second lower bed underlaps the upper bed;
    wherein the upper seat comprises a seat back and a seat base, the fore-facing lower seat comprises a seat back and a seat base, and the aft-facing lower seat comprises a seat back and a seat base and;
    wherein the upper seat, the fore-facing lower seat, and the aft-facing lower seat are arranged such that the seat base of the aft-facing lower seat in a sitting condition and the seat base of the fore-facing lower seat in a sitting condition do not underlap the seat base of the upper seat in a sitting condition.

10. A seating module, comprising:
    a shell;
    an upper seat movably attached to the shell, the seat comprising a seatback and a seat base configurable into an upper bed;

a first lower footwell configured to receive a foot of a passenger of a fore-facing lower seat converted into a first lower bed, the first lower footwell underlapping the upper bed; and a second lower footwell configured to receive a foot of a passenger of an aft-facing lower seat converted into a second lower bed, the second lower footwell underlapping the upper bed;

wherein the fore-facing lower seat comprises a seat back and a seat base, and the aft-facing lower seat comprises a seat back and a seat base and;

wherein the upper seat, the fore-facing lower seat, and the aft-facing lower seat are arranged such that the seat base of the aft-facing lower seat in a sitting condition and the seat base of the fore-facing lower seat in a sitting condition do not underlap the seat base of the upper seat in a sitting condition.

11. The seating module of claim 10, wherein the first lower footwell is provided below a foot portion of the upper bed and the second lower footwell is provided below a head portion of the upper bed.

12. The seating module of claim 11, wherein the upper seat further comprises an upper foot portion configured to receive a foot of a passenger of the upper seat.

13. The seating module of claim 12, wherein the upper foot portion comprises a footrest engageable with the seat base of the upper seat when the upper seat is converted into an upper bed.

14. A seating arrangement, comprising:
an aft-facing lower seat convertible into a first lower bed;
a fore-facing lower seat convertible into a second lower bed;
an upper seat convertible into an upper bed, the upper seat between the aft-facing lower seat and the fore-facing lower seat wherein the upper seat does not overlap the aft-facing lower seat and the fore-facing lower seat when the upper seat is in a sitting condition;
a first lower footwell underlapping the upper bed; and
a second lower foot underlapping the upper bed.

15. The seating arrangement of claim 14 wherein the first lower footwell is configured to receive a foot of a passenger of the first lower bed and the second lower footwell is configured to receive a foot of a passenger of the second lower bed.

16. The seating arrangement of claim 14 wherein the first lower footwell is configured to receive a foot of a passenger of the second lower bed and the second lower footwell is configured to receive a foot of a passenger of the first lower bed.

17. The seating arrangement of claim 14 further comprising an upper footrest overlapping the first lower footwell.

18. The seating arrangement of claim 14 further comprising a shell, wherein the upper seat is movably attached to the shell.

19. The seating arrangement of claim 14, wherein the upper seat comprises a seat back and a seat base, the aft-facing lower seat comprises a seat back and a seat base, and the fore-facing lower seat comprises a seat back and a seat base, and wherein the seat base of the aft-facing and fore-facing lower seat do not underlap the seat base of the upper seat when the upper seat and the fore-facing and aft-facing lower seats are in a sitting position.

20. The seating arrangement of claim 14, wherein the upper seat is fore-facing.

21. A vehicle seating arrangement, comprising:
a fore-facing lower seat having a base and a back, the fore-facing lower seat convertible between a sitting position and a sleeping position in a first lower plane;
an aft-facing lower seat convertible between a sitting position and a sleeping position in a second lower plane;
an upper seat positioned between the fore-facing lower seat and the aft-facing lower seat, the upper seat convertible between a sitting position and a sleeping position in an upper plane;
the upper seat having a base and a back, the base of the upper seat positioned vertically below an upper portion of the back of the fore-facing lower seat; and
wherein the fore-facing lower seat, the aft-facing lower seat, and the upper seat are arranged so that a portion of the fore-facing lower seat and aft-facing lower seat underlap the upper seat when the fore-facing lower seat, the aft-facing lower seat and the upper seat are positioned in the sleeping position.

* * * * *